(12) United States Patent
Lim et al.

(10) Patent No.: US 8,690,535 B2
(45) Date of Patent: Apr. 8, 2014

(54) MEASURING LOADS ON WIND TURBINE BLADES

(75) Inventors: Chee Kang Lim, Singapore (SG); Teck Bin Arthur Lim, Singapore (SG); Kok Leong Chong, Singapore (SG); Li Hong Idris Lim, Singapore (SG); Whye Ghee Kim, Singapore (SG); Tian Lim, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 641 days.

(21) Appl. No.: 12/954,737

(22) Filed: Nov. 26, 2010

(65) Prior Publication Data

US 2011/0110778 A1 May 12, 2011

Related U.S. Application Data (60) Provisional application No. 61/264,930, filed on Nov. 30, 2009.

(30) Foreign Application Priority Data

Nov. 30, 2009 (DK) .................................. 2009 70235

(51) Int. Cl.
F03D 7/04 (2006.01)
(52) U.S. Cl.
USPC ..................................... 416/1; 416/23; 416/61
(58) Field of Classification Search
USPC ........................ 415/118; 416/1, 23, 61, 87, 88
See application file for complete search history.

(56) References Cited

U.S. PATENT DOCUMENTS

| 6,295,006 | B1 | 9/2001 | Kohlhepp | |
|---|---|---|---|---|
| 2007/0036653 | A1* | 2/2007 | Bak et al. | 416/98 |
| 2008/0317598 | A1 | 12/2008 | Barbu et al. | |
| 2009/0290982 | A1* | 11/2009 | Madsen et al. | 416/61 |
| 2010/0247314 | A1* | 9/2010 | Narasimalu | 416/146 R |
| 2010/0259046 | A1* | 10/2010 | Kota et al. | 290/44 |

FOREIGN PATENT DOCUMENTS

| CN | 101354008 | | 1/2009 |
|---|---|---|---|
| WO | WO2007/074173 | * | 7/2007 |
| WO | 2008/003330 | | 1/2008 |
| WO | 2009/056136 | | 5/2009 |
| WO | WO2009/061478 | * | 5/2009 |

OTHER PUBLICATIONS

Castaignet et al., Adaptive Trailing Edge Flaps, Mar. 2009, ewec2009/257.*
Johannes Ahrenkiel-Frellsen; 1st Technical Examination Report issued in priority Denmark Application No. PA 2009 70235; Jun. 29, 2010; 4 pages; Denmark Patent and Trademark Office.

* cited by examiner

*Primary Examiner* — Edward Look
*Assistant Examiner* — Liam McDowell
(74) *Attorney, Agent, or Firm* — Wood, Herron & Evans, LLP (57) ABSTRACT

A sensor system for measuring aerodynamic loads acting on a wind turbine rotor blade is disclosed. The measured aerodynamic loads can be converted to an angle of attack of the resulting wind which flows past the moving rotor blade. The sensor is realized as a trailing edge flap which is elastically moveable relative the main part of the wind turbine blade. By measuring motion of the trailing edge flap or corresponding motions of components of the sensor system, the aerodynamic forces acting on the blade can be determined. Due to the relative small dimensions of the sensor flap and the relative small displacements of the flap, the sensor system only affects the aerodynamic properties insignificantly.

14 Claims, 7 Drawing Sheets

MEASURING LOADS ON WIND TURBINE BLADES

CROSS-REFERENCE TO RELATED APPLICATIONS

This application claims priority under 35 U.S.C. §119(a) to DK Application No. PA 2009 70235, filed Nov. 30, 2009. This application also claims the benefit of U.S. Provisional Application No. 61/264,930, filed Nov. 30, 2009. Each of these applications is incorporated by reference herein in its entirety.

TECHNICAL FIELD

The invention relates to sensor systems for wind turbines, in particular to sensor systems for measuring loads on blades.

BACKGROUND

In order to improve power efficiency of wind turbine generators the aerodynamic properties of wind turbine blades may be adapted to wind conditions by adjusting the pitch of blades or otherwise modifying the shape of blades. In particular it may desirable to adjust or optimise the lift on blades. However, in order to adjust the lift properly, the angle and speed of the resulting air impinging on the blade should be known. The angle of the resulting air flow is commonly referred to as the angle of attack.

The angle of attack may be measured by pitot tubes arranged at the blade. However, the pitot tube protrudes out from the blade and affects the aerodynamics of the blade. The pitot tube may also be sensitive to dirt and other environmental exposures.

Accordingly, it would be desirable to have a sensor for determining the angle of attack which is robust enough to withstand the harsh environmental conditions which wind turbine generators are often exposed to. It would also be desirable to have a sensor which minimizes undesired effects on the aerodynamic properties of the wind turbine blades.

US 2008/0317598 discloses a wind turbine blade assembly which includes at least one local load sensor disposed on and/or within a surface of the wind turbine blade and at least one active flow modification device disposed on and/or within a surface of the wind turbine blade and configured to alter the aerodynamics of the wind turbine blade in response to real time local load sensor measurements such that a difference between a current angle of attack and an optimum angle of attack on the wind turbine blade is substantially minimized.

Whereas US 2008/0317598 discloses load sensors such as optical sensors for determining local blade loads and obtaining an angle of attack from the measured load, there is a need to find alternative methods and systems for determining the angle of attack.

SUMMARY

In general, the invention preferably seeks to alleviate or eliminate one or more of the above mentioned problems of determining the angle of attack of the resulting wind impinging a blade on a wind turbine. In particular, it may be seen as one aspect of the present invention to provide a robust measurement system for enabling determination of the angle of attack.

To better address one or more of these concerns, in a first aspect of the invention a wind turbine blade sensor for sensing loads on a wind turbine blade is presented. The sensor comprises, a trailing edge flap connectable with the blade, a restraining connection for connecting the trailing edge flap with the blade so as to enable linear or rotational movement of the flap relative the blade depending on a load acting on the flap, and a motion sensor for sensing the linear or rotational movement of the trailing edge flap relative to the blade.

The trailing edge flap may be a sensor flap arranged to receive and react in response to aerodynamic loads. Thus, the sensor flap may be distinct from other trailing edge flaps used for modifying the aerodynamic properties of the wind turbine blade.

Advantageously, the restraining connection may be configured so that the magnitude of the movement of the flap is limited so as to not affect the aerodynamic properties significantly. Since the sensitivity of the motion sensor may be selected according to the highest acceptable magnitude of movement of the flap, the blade sensor may advantageously be designed to have insignificant effect on the aerodynamic properties even when it is maximally displaced.

From the measured movement of the flap, a corresponding force acting on the sensor flap can be determined. The determined force can be used to determine the angle of attack of the resulting wind acting on the blade.

The trailing edge flap and the restraining connection constitute a simple mechanical construction containing only few moveable parts such as bearings and springs. Accordingly, the blade sensor is reliable and offers stable operation even under strong loads. Furthermore, due to the simple construction the sensor may be highly insensitive to airborne dirt.

Advantageously, the flap sensor may be located close to the aerodynamic modifying trailing edge flaps so that the flap sensor and the flap actuator are exposed to substantially the same loads.

In an embodiment, the restraining connection may be configured to enable linear or rotational movement substantially in only one dimension, such as a rotational or linear dimension.

In an embodiment, the blade sensor may comprise both first and second restraining connections, each being configured to enable movement of the trailing edge flap in first and second different dimensions, and comprising first and second displacement sensors for sensing the first and second movements. It may be advantageous to determine motions of the flap in different directions since the different motion directions can be converted to different force components of the aerodynamic load acting on the blade. Accordingly, the aerodynamic load may be determined more accurately and, consequently, the angle of attack may also be determined more accurately by configuring the blade sensor to be moveable in at least first and second directions.

In an embodiment, the restraining connection may comprise an elastic element for limiting a magnitude of the linear or rotational movement of the flap. The elastic element, for example a spring or a pair of springs, may advantageously be selected to have a high stiffness so as to limit motion amplitudes of the flap.

In an embodiment, the restraining connection may be a self-restoring connection having a neutral position corresponding to a neutral position of the flap. The restraining connection may advantageously be self-restoring in the sense that the restraining connection and the sensor flap positions are in their given neutral position when no aerodynamic loads act on the blade.

In an embodiment, the self-restoring connection may comprise first and second elastic components, for example springs, arranged to affect the restraining connection with equal, or substantially equal, both but opposite non-zero forces. The neutral position of the sensor flap and the restraining connection may advantageously be obtained by preloading the restraining connection, e.g., a pivotable connection, with equal but opposite spring forces to obtain a stationary position. Furthermore, preloading the restraining connection with non-zero spring forces may advantageously limit any undesired clearance when the restraining connection moves away from the neutral position.

In an embodiment, the restraining connection may comprise a guide for constraining the direction of the movement of the flap. The guide may be a linear guide or a rotational guide for controlling the direction in which the flap moves when loads act on the flap.

In an embodiment, the restraining connection may enable linear or rotational movement in two opposite directions of the flap so as to enable determination of positive and negative forces along a given direction.

In an embodiment, the blade sensor may comprise a first part fixed to the blade and a second part fixed to the trailing flap, where the first part is moveable relative to the second part via a linear or rotational guide having a single motional degree of freedom and where motion between the first and second parts is restrained by the restraining connection.

In an embodiment, the motion sensor may be fixed to the first part or the second part and is configured to sense a distance to the opposite respective second or first part via contact or non-contact sensing. Whereas contact sensing may be used, non-contact sensing may be preferred in order to improve the lifetime of the sensor system.

A second aspect of the invention relates to wind turbine blade comprising, one or more controllable trailing edge flaps for changing aerodynamic properties of the blade, and one or more blade sensors according to the first aspect.

The blade sensor may advantageously be combined with controllable trailing edge flaps since this enables controlling the controllable trailing edge flaps using the angle of attack determined using the sensor output of the blade sensor. Advantageously, a blade sensor may be placed adjacent to a controllable trailing edge flap to improve accuracy of adjustments of the trailing edge flap.

A third aspect of the invention relates to a wind turbine comprising one or more blades according to the second aspect.

A fourth aspect of the invention relates to a method for sensing loads on a wind turbine blade, the method comprising, providing a trailing edge flap connected to the blade, providing a restraining connection connecting the trailing edge flap with the blade so as to enable linear or rotational movement of the flap relative the blade depending on a load acting on the flap, and determining a flap force acting on the flap by sensing the linear or rotational movement of the flap using a motion sensor.

According to an embodiment, the method for sensing loads may further comprise, determining an angle of attack of a resulting wind acting on the blade using the flap force and a magnitude of the resulting wind.

In summary, aspects of the invention relate to a sensor system for measuring aerodynamic loads acting on a wind turbine rotor blade. The measured aerodynamic loads can be converted to an angle of attack of the resulting wind which flows past the moving rotor blade. The sensor is realised as a trailing edge flap which is elastically connected and moveable relative the main part of the wind turbine blade. By measuring motion of the trailing edge flap or corresponding motions of components of the sensor system, the aerodynamic forces acting on the blade can be determined. Due to the relative small dimensions of the sensor flap and the relative small displacements of the flap, the sensor system only affects the aerodynamic properties insignificantly.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION

Figure 1:
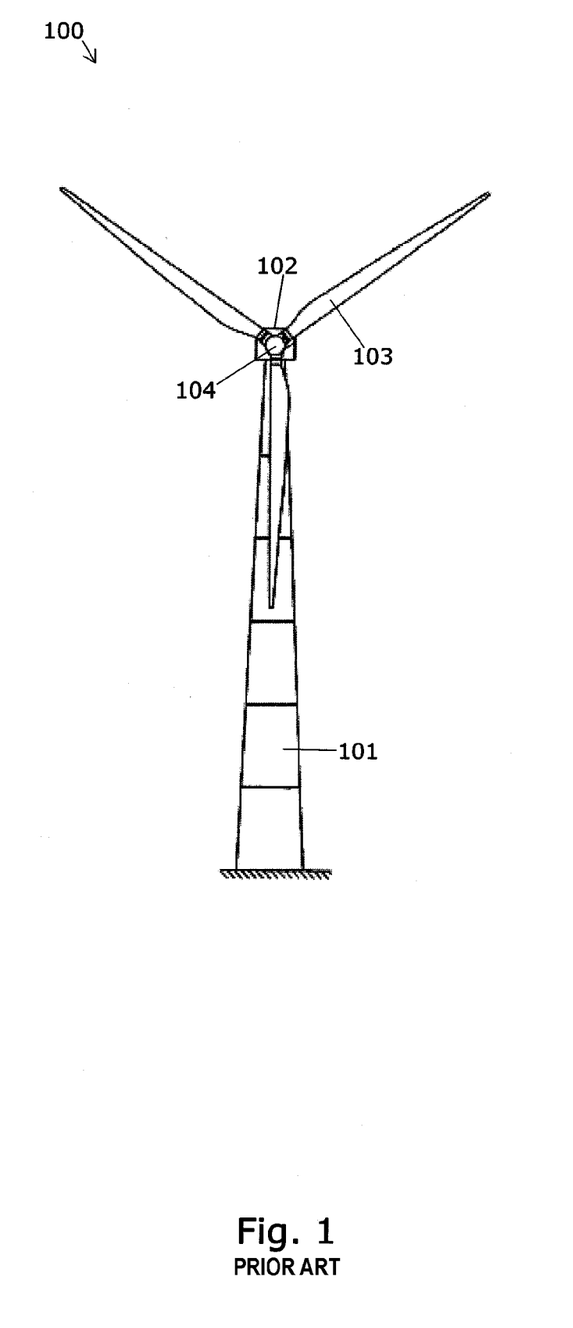
FIG. 1 shows a wind turbine generator.

FIG. 1 shows a wind turbine generator 100 comprising a tower 101 and a nacelle 102. Rotor blades 103 are fixed to a hub 104. The assembly of rotor blades 103, i.e. the rotor, is rotatable by action of the wind. Thus, the wind induced rotational energy of the rotor blades 103 may be transferred via the hub to a generator in the nacelle. Thus, the wind turbine generator 100 is capable of converting energy of the wind into mechanical energy by means of the rotor blade and, subsequently, into electric energy by means of the generator.

Rotor blades 103 or just blades 103 includes, but is not limited to, an elongated structure having an airfoil-shaped profile suitable for providing an aerodynamic lift upon relative movement through air.

The blades 103 may be provided with aerodynamic or lift modifying means (not shown), for example pivotable trailing edge flaps, deformable trailing edge flaps or air flow jets arranged on the blade to modify the aerodynamics by generating airflows.

Figure 2A:
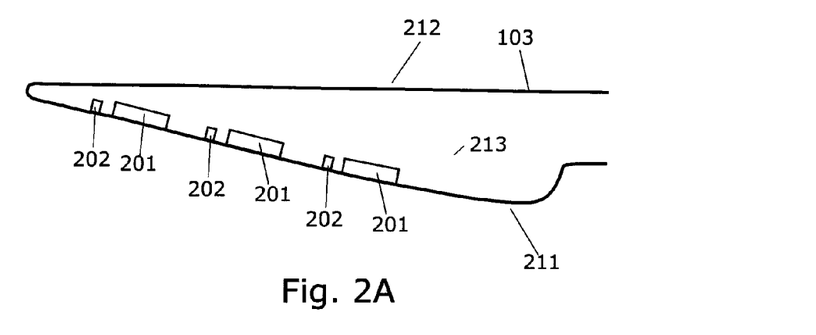
FIG. 2A shows a wind turbine blade with blade sensors and controllable flaps.

FIG. 2A shows a blade 103 having lift-modifying trailing edge flaps 201 pivotably connected to the trailing edge 211 of the blade. The lift-modifying flaps 201, or generally devices capable of modifying the aerodynamic properties of the blades, are able to change the flow of air, such as the flow direction, in the vicinity of the blade. The blade may have one or more trailing edge flaps arranged along the trailing edge. Alternative lift modifying means as mentioned above may be used equivalently, as well as inflatable blade devices capable of modifying the aerodynamic profile by inflation. Whereas lift modifying means may preferably be arranged along the trailing edge, the lift modifying means may also be arranged along the leading edge 212, or on the top and/or bottom surface 213 of the blade.

The blade 103 is provided with blade sensors 202 arranged along the trailing edge 211. Preferably, the blade sensors 202 may be arranged close to the lift modifying means 201, and preferable one blade sensor 202 may be arranged for each lift modifier 201. The blade sensors 202 are configured to measure local loads acting on the sensors 202. Accordingly, by placing sensors 202 close to the lift modifiers 201, the load sensed by the sensor 202 corresponds to the load acting on the adjacent lift modifier 201.

Figure 2B:
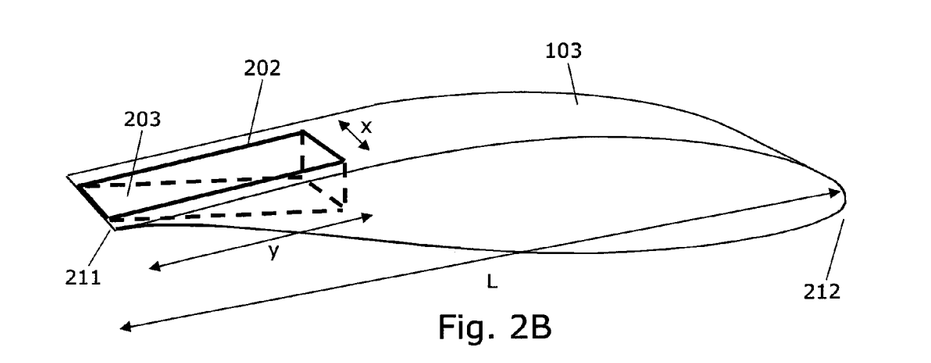
FIGS. 2B-C show the trailing edge flap of a blade sensor.

FIG. 2B shows a blade section of the blade 103 comprising a blade sensor or sensor module 202. The blade sensor comprises a blade flap or trailing edge flap 203 which is rotatably and/or displaceably connected relative to the blade 103.

Figure 2C:
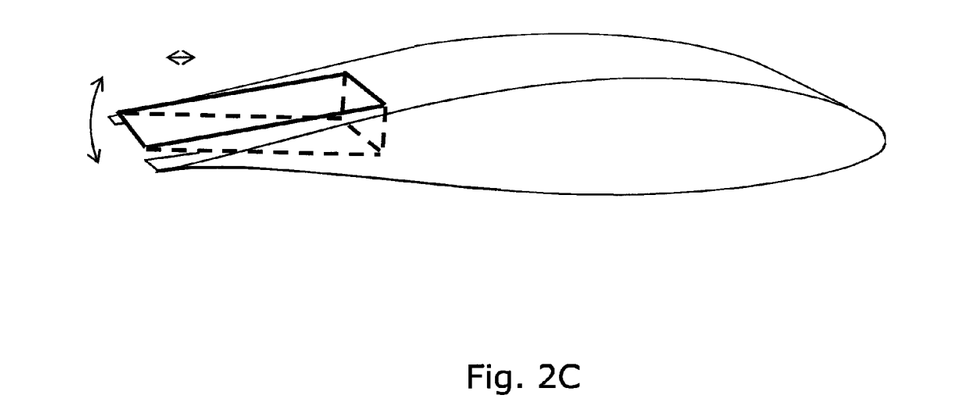

FIG. 2C shows the blade section of FIG. 2B where the blade flap 203 has been rotated and displaced due to the action of aerodynamic forces.

As an example, a blade flap 203 may have length y of 240 mm and a width x of 120 mm. Expressed in terms of the chord length L, the length y may amount to between 10% and 30% of the chord length, for example 20% of the chord length.

Figure 3A:
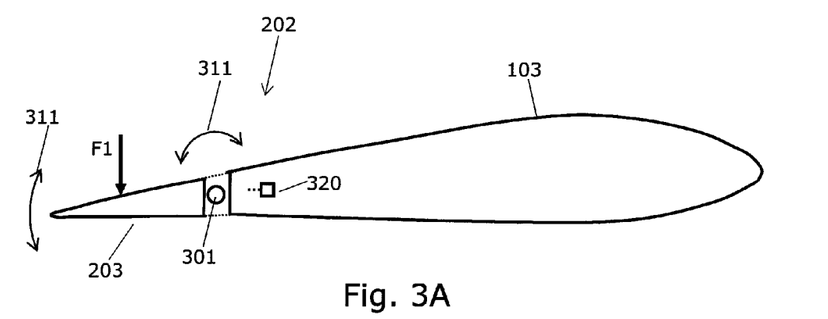
FIGS. 3A-C illustrate operational sensing principles of blade sensors.
Figure 3B:
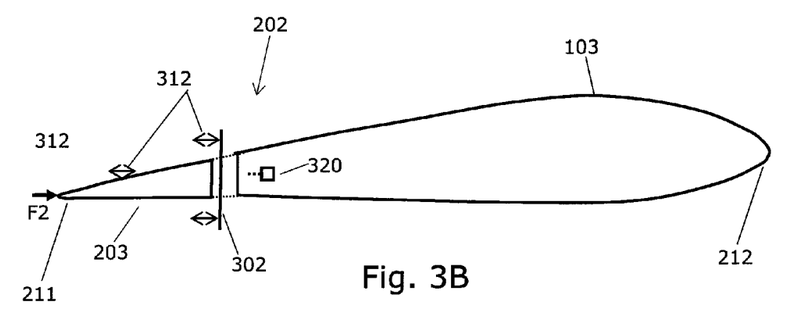
Figure 3C:
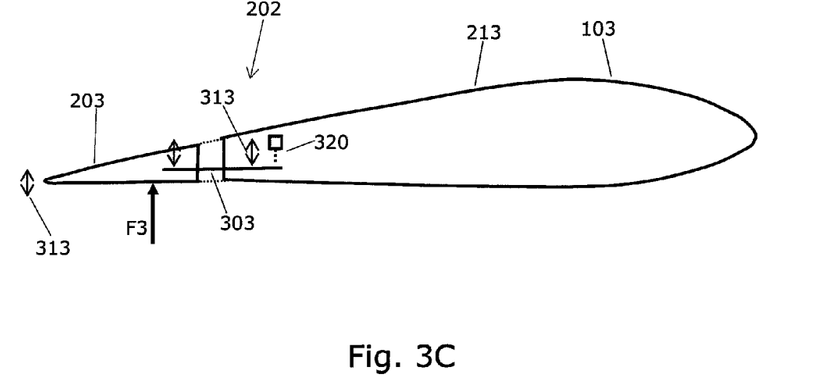

FIG. 3A-C schematically illustrates embodiments of blade sensors 202 for measuring aerodynamic blade loads.

FIG. 3A shows a blade 103 comprising a sensor module 202 with a trailing edge flap or blade flap 203 rotatably connected to the blade 103 via a hinged or rotatable connection 301 to enable rotation 311 about the pivot axis 301. The rotatable connection 301 is configured as a restraining connection 301 for elastically restraining the amplitude of the rotation 311. Accordingly, the restraining connection may be enabled as an elastic or visco-elastic connection, e.g., a spring, which has a neutral rotational position and is rotationally self-restoring to its neutral angular position. Thus, the restraining connection 301 enables the flap 203 to rotate when a load or pressure F1 acts on the blade. When no load F1 acts on the flap 203, the flap returns to its neutral angular position. In the neutral position the flap may preferably be positioned so that is does not deviate substantially from the aerodynamic profile of the blade 103, i.e., so the flap affects the aerodynamic properties as little as possible.

A motion sensor 320 is provided to measure the rotation 311 of the trailing edge flap 203. The motion sensor may be a non-contact sensor such as an optical or ultrasonic displacement or rotation sensor which is capable of sensing linear or angular displacement or rotation without physical contact to the moving part. The non-contact sensor comprises optical and magnetic linear and angular encoders. Alternatively, the sensor may be a contact sensor such as a linear or angular encoder connected to the moving part.

Accordingly, the force or pressure F1 acting on the trailing edge flap 203 can be determined from the rotation or displacement amplitude measured by the motion sensor 320 using the known elasticity of the restraining connection 301.

FIG. 3B shows a blade 103 comprising a sensor module 202 with a trailing edge flap 203 displaceably connected to the blade 103 via a linear connection 302 to enable linear displacement 312 in a direction which is merely coincident with a line connecting the leading edge 212 with the trailing edge 211. The linear connection 302 is configured as a restraining connection 302 for elastically restraining the amplitude of the linear displacement 312. Similarly to the rotational connection 301, the linearly restraining connection 302 may be enabled as an elastic or visco-elastic connection which has a neutral linear position and is displaceably self-restoring to its neutral linear position. Thus, the linearly restraining connection 302 enables the flap 203 to displace when a load or pressure F2 acts on the flap 203. When no load F2 acts on the flap 203, the flap returns to its neutral linear position. In the neutral position the flap is positioned so that is does not deviate from the aerodynamic profile of the blade 103, i.e., so the flap affects the aerodynamic properties as little as possible. Practically, in the neutral position the flap 203 may be placed close to the blade 103 to minimise the gap between the flap and the blade 103.

The force or pressure F2 acting on the trailing edge flap 203 can be determined from the displacement measured by the motion sensor 320 using the known elasticity of the restraining connection 302.

FIG. 3C shows a trailing edge flap 203 connected to the blade 103 via a linear restraining connection 303 configured to enable linear displacement 313 in a direction which is merely normal the surface 213 of the blade. Again, the self-restoring restraining connection is elastic or visco-elastic and arranged to hold the flap 203 in a neutral position when no force F3 acts on the flap. A displacement sensor 320 is arranged to sense displacements 313 to enable determination of the force F3 using the elasticity value of the elastic connection 303.

It is noted that the Figures may represent schematic illustrations and that the explaining description may not include all construction details in order to focus on essential concepts. Accordingly, as an example, it is understood that the hinged or rotatable connection 301 need not be directly connected to the blade 103, but may be connected to some structure which eventually is connected or fixed to the blade 103. Therefore, the blade flap 203 may be connected to the blade via a rotatable connection 301 and possibly other structures. The same applies to other connections, such as the linear connections 302, 303 which may be connected to the flap 203 and the blade 103 via other structures or directly.

Figure 4A:
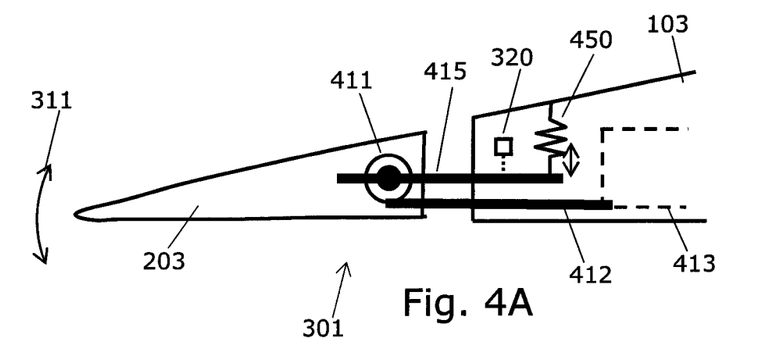
FIGS. 4A-C illustrate embodiments of blade sensors.
Figure 4B:
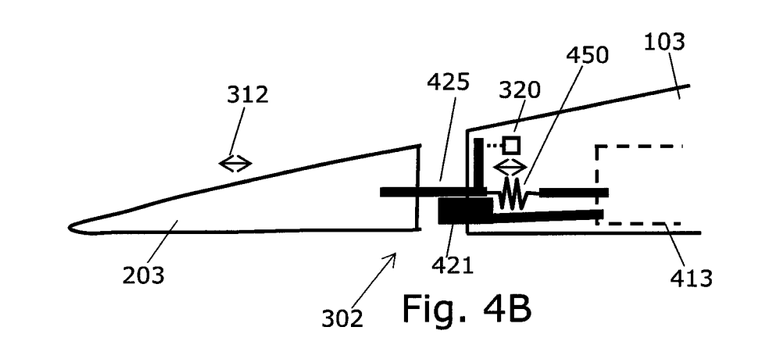
Figure 4C:
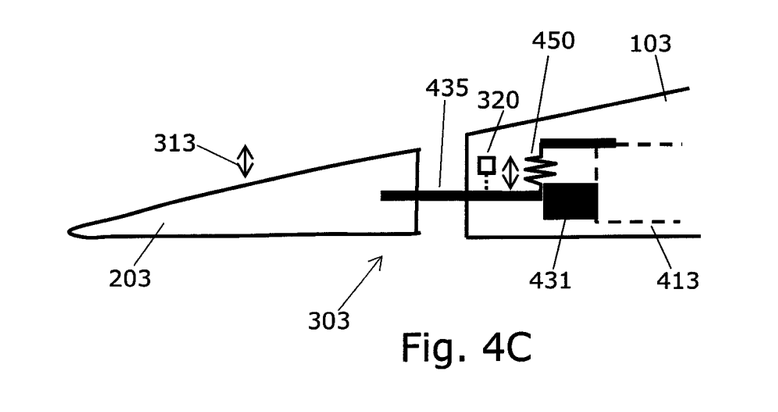

The restraining connections 301-303 may be constructed in different ways, for example as schematically illustrated in FIGS. 4A-C.

FIG. 4A shows a rotatable restraining connection 301 comprising a pivot link 411, e.g., a bearing, which is fixed to the blade 103 or blade spar 413 via connection 412 to enable rotation of the flap 203 relative to the blade 103. One end of an arm 415 is rotatably connected to a rotatable part of the pivot link 411, and an opposite end of the arm 415 is connected to an elastic element 450 such as a spring fixed to a part of the blade 103, the spar 413 or other support structure. Accordingly, the elastic element 450 comprised by the restraining connection 301 has the function of restraining rotation of the flap by restraining rotation of the arm 415. A motion sensor 320 is provided to quantify the angular rotation by sensing the displacement of the arm 415.

Instead of the restraining element 450, rotation of the flap 203 could be elastically restrained by a flexural pivot link 411, i.e., a bearing configured to elastically restrain rotation of the bearing.

FIG. 4B shows a linearly restraining connection 302 comprising an arm 425 fixed to the flap 203 and displaceably connected to a linear guide 421, e.g., a linear bearing, which is fixed to the blade 103 or spar 413 to enable linear displacement of the flap 203 relative to the blade 103 in direction 312. The motion of the arm 425 and, thereby, the flap 203 is restrained by an elastic element 450. A motion sensor 320 is provided to quantify the linear displacement of the flap by sensing the displacement of the arm 425.

FIG. 4C a linearly restraining connection 303 configured to elastically restrain displacement in a direction 313 merely perpendicular to the surface 213 of the blade. The restraining connection 303 is functionally equivalent to the restraining connection 302 and comprises an elastic element 450, a connection 435 connecting the flap 203 to the blade 103 via the elastic element 450, a linear guide 431 to enable only linear displacement of the flap in a given linear direction 313, and a motion sensor 320 for enabling sensing of forces acting on the flap.

Commonly, the blade sensor embodiments 202 comprise a first part fixed to the blade, for example the guide 411, 421, 431 or part of the guide such as a centre part of the pivot link 411, and a second part fixed to the trailing edge flap, for example the guide 411, 421, 431 or part of the guide, such as the outer part of the pivot link 411 or a connection arm 425, 435. The first part is moveable relative to the second part via the guide 411, 421, 431 and the amplitude of relative motion is constrained via the restraining connection 301-303, for example the elastic element 450. Preferably, the guide has a single motional degree of freedom; however integrated guides with two or more degrees of freedom may be used as an alternative.

In order to measure the relative motion between the first part and the second part, or equivalently between the flap 203 and the blade 103, a motion sensor is placed in fixed relationship with the first part or the second part and is configured to measure the distance to the opposite part, i.e., the respective second part or first part via contact or non-contact sensing.

In an embodiment the elastic element 450 may be combined with a damper (not shown) to avoid motional oscillations of the flap 203. The damper may be connected in parallel with the elastic element 450 to effectively form a visco-elastic element 450.

Accordingly, the restraining connection 301-303 may be enabled via connections 415,425,435 connecting the flap 203 to the blade 103 via an elastic element 450 arrange to restrain rotation 311 or linear displacements 311-312 of the flap.

Each of the restraining connections 301-303 are configured to enable linear or rotational motion in only one direction, or substantially only in one direction, for example by use of linear 421, 431 or rotational 411 guides.

The restraining connection need not only comprise one of the angular or linear restraining connections 301-303, but may alternatively comprise two or more such restraining connections 301-303 in a multi-directional restraining sensor module 202 to enable detection of forces F1, F2, F3 in different directions 311-313. Thus, it is possible to have first and second restraining connections, where each connection is configured, for example, via guides 411, 421, 431, to enable motion of the trailing edge flap in first and second different directions 311, 312, 313. The independent displacements may be measured with independent motion sensors 320.

The elastic elements 450 and the restraining connections 301-303 are preferably configured to enable linear or rotational motion in opposite directions. Thus, the pivot link 411 and the elastic element 450 may be configured to enable clockwise and counter clockwise rotations.

Figure 5:
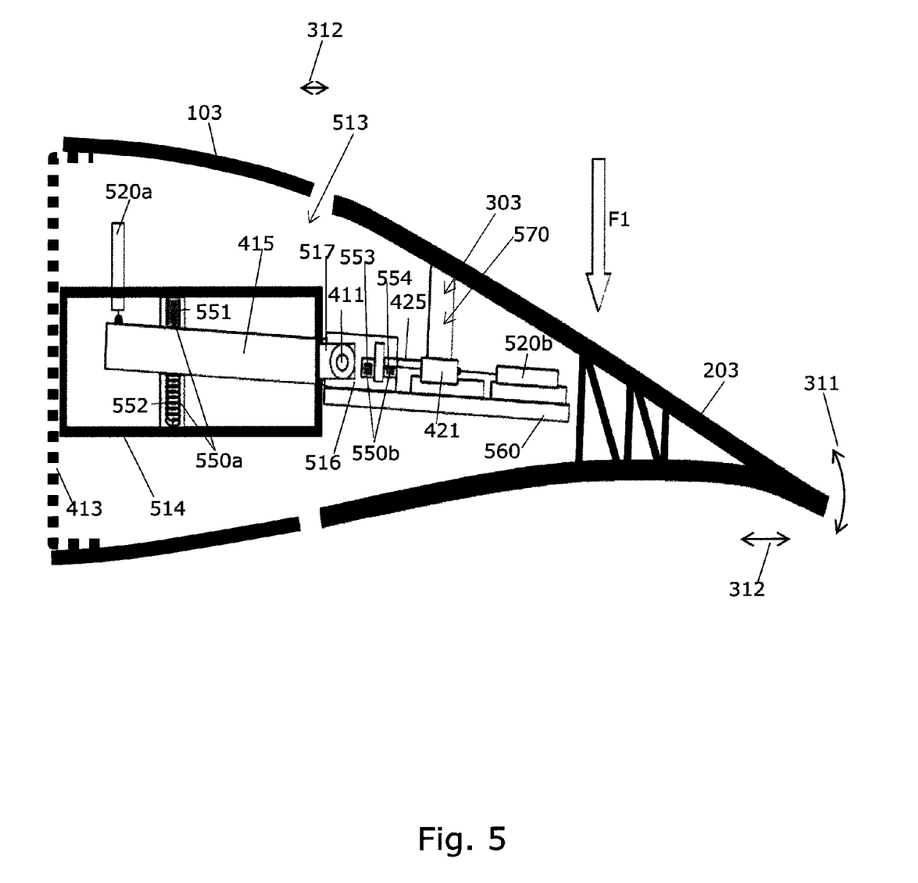
FIGS. 5-6 show a blade sensor capable of sensing flap motion in more than one direction.

FIG. 5 shows the flap 203 which is connected to the blade 103 and the blade spar 413 via a sensor module 513. The sensor module 513 comprises first and second elastic or restraining elements 550a, 550b for restraining rotation 311 and displacement 312, respectively. The flap 203 is rotatably connected to the blade 103 via a pivot link 411. In detail, the flap 203 is connected to an upper part of linear guide 421 which lower part is connected to platform 560. The platform 560 is connected to a lever arm 415 via a block 516. The rectangular block 516 is supported by pivot link 411 which is mounted on a bearing house 517 which is fixed to the support structure 514. Accordingly, the flap 203, the guide 421, the platform 560, the arm 415 and the block 516 is rotatably connected to the support structure 514 and the blade 103 via the pivot link or bearing 411. Rotation of the arm 415 and, thereby the flap 202, relative to the blade 103 is restrained by springs 551,552 or similar first and second elastic components of the restraining element 550a, and the springs are fixed to the blade 103 via the support structure 514 fixed to the blade spar 413. The springs are arranged as a self-balanced system to affect the arm 415 or the restraining connection 301-303 with equal both but opposite non-zero spring forces, so that when no external aerodynamic forces acts to rotate the flap, the flap is automatically oriented in a neutral position.

In addition to rotational connection, the flap 203 is also displaceably connected to the blade 103 via an arm 425 which is connected to the second restraining element 550b. Displacement of the arm 425 is restrained by springs 553, 554 of the restraining element 550b. Also, these springs are arranged as a self-balanced system to affect the arm 425 with equal but counter acting spring forces. The motion of the arm 425 is constrained by linear guide 421 so that only displacement along direction 312 is allowed.

The second restraining element 550b, the arm 425 and the linear guide 421 is arranged on a platform 560 connected to the pivot link 411 to enable linear displacements independently of the rotational motion of the flap. Thus, rotational and linear motions are decoupled to enable independent detection of each motions and, therefore, forces F1, F2 and F3.

Thus, the restraining elements 550a and 550b together with arms 415 and 425 and linear or rotational guiding means 411 and 421 constitute first and second constraining connections.

The rotation 311 of the flap 203 is measured by motion sensor 520a by sensing the linear displacement of the arm 415 relative a stationary point on the blade 103. Alternatively, an angular encoder may be used to detect rotation. Similarly, the linear displacement 312 is measured by motion sensor 520b by sensing the linear displacement of the arm 425 relative to a point on the hinged platform 560.

The sensor module 513 of FIG. 5 does not have a sensing mechanism for measuring loads F3 or displacements in the vertical direction 313, such as the sensor module 313 shown in FIG. 4C. However, such sensing mechanism 303 could have been integrated in arm 570 as indicated in FIG. 5.

In FIG. 5 the flap 203 is affected by aerodynamic force F1 causing the flap to rotate about the pivot link or bearing 411. The rotational amplitude is restrained according to the stiffness of the restraining element 550a. Instead of using springs 551, 552, the restraining elastic element could have been integrated into the pivot link to form a flexural link.

Figure 6:
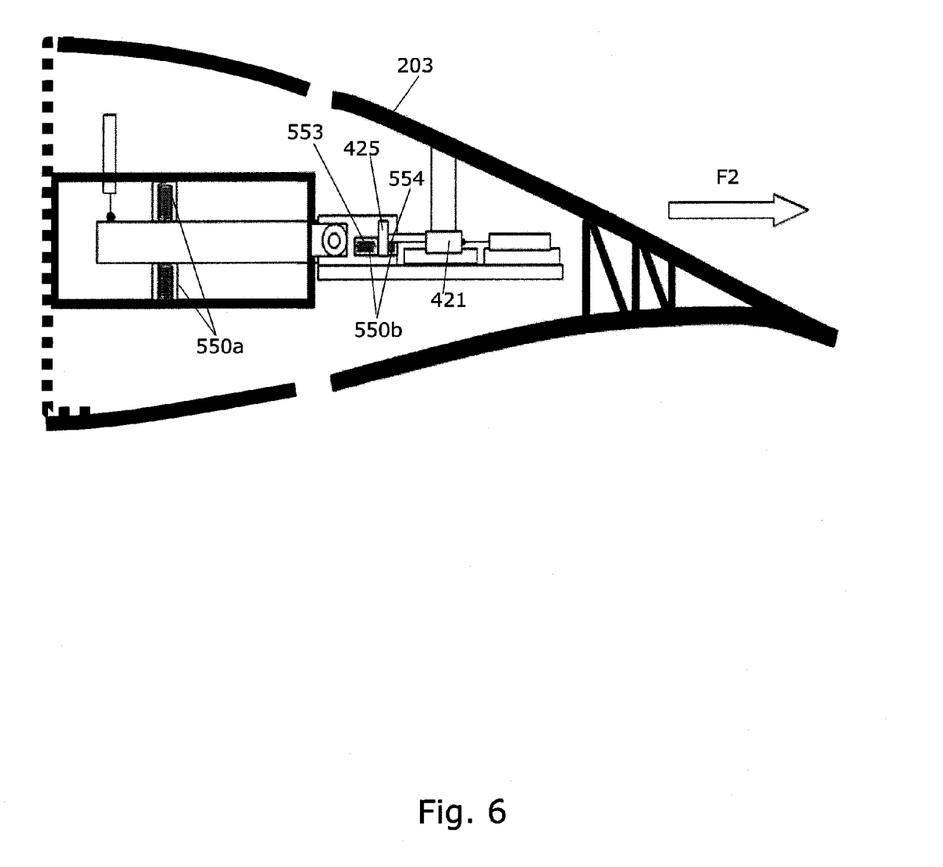

FIG. 6 shows the sensor module 513 of FIG. 5 when it is affected only by an aerodynamic force F2. The force F2 causes the flap to move to the right. The displacement is restrained by the springs 553, 554 of the restraining connection 550b and the direction is constrained by the linear guide 421. In FIG. 6 no aerodynamic loads act to rotate the flap and, therefore, the restraining element 550a is in a neutral position.

The restraining elements 450, 550a, 550b preferably have a sufficiently high stiffness so that the flap only rotates or displaces by small amounts so that the flaps 203 do not affect the aerodynamic properties significantly. For example, whereas the lift modifying flaps 201 may be allowed to rotate a given angle to modify an aerodynamic property, the flaps 203 of the sensors 202 may be restrained to rotate only a fraction of the possible rotation of lift-flaps 201. Since the motion sensors 320 may have a high accuracy, only a small displacement amplitude of the sensor flaps 202 is required.

The stiffness or spring rate of the elastic elements 450, 550a, 550b generally depends on the design of the blade sensor. Thus, the spring rate depends on the dimensions the sensor flap 203. Thus the bigger the flap, the more it captures the aerodynamic load and, consequently, the greater the spring rate should be. Furthermore, the spring rate depends on the absolute resulting wind speed. Accordingly, the spring rate of elastic elements 550a, 550b, 450 located near the tip end of the blade 103 may be greater than spring rates of elastic elements located closer to the root end of the blade. In other words, the spring rate may increase with increasing radial distance from the hub 104. The spring rate of elastic element 550a for measuring the F1 moment generally depends on the length of arm 415.

Figure 7A:
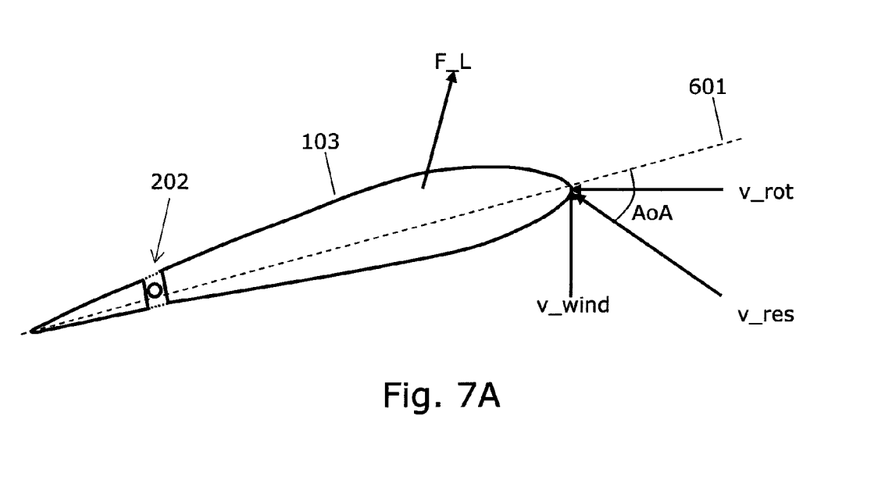
FIG. 7A illustrates the angle of attack corresponding to the direction of the resulting wind.

FIG. 7A shows the profile of a blade 103 with a blade sensor 202. FIG. 7A illustrates the resulting wind vector v_res which is generated by the wind vector v_wind, i.e., the actual wind, and the rotation speed vector v_rot, i.e., the rotation speed of the rotor. The angle of the resulting wind v_res relative to the chord direction 601 is the angle of attack AoA. The angle of attack influences the magnitude and direction of the lift force F_L which determines the shaft torque available for generation of electric power.

By use of a blade sensor 201-203, 513 one or more aerodynamic loads F1-F3 acting on the blade can be determined. Having determined a load acting on a blade flap 203, the angle of attack AoA can be determined, e.g., from a look up table which may have been determined from wind tunnel experiments where a blade is exposed to different resulting wind speeds and different angle of attacks.

Figure 7B:
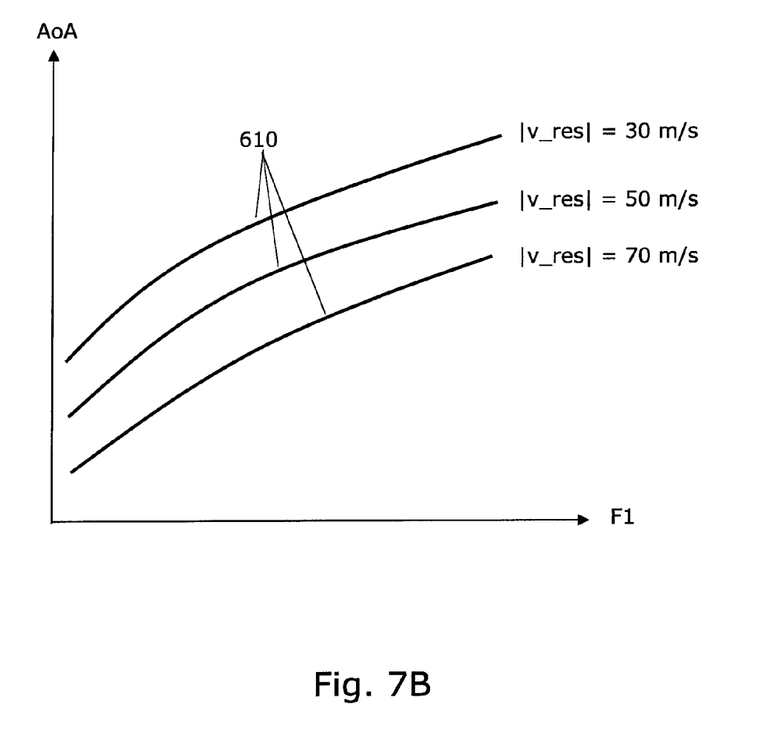
FIG. 7B shows how the angle of attack can be determined from determined flap forces using a computed or experimentally determined look-up table.

FIG. 7B illustrates a look up table which relates a blade load, e.g., a load F1, to values of the angle of attack AoA for different absolute resulting wind speeds 610. FIG. 7B illustrates only three different absolute resulting wind speeds 610, i.e. 30 m/s, 50 m/s and 70 m/s for convenience. The absolute wind speed can be determined as the resultant of the wind speed v_wind and the blade speed. The wind speed v_wind may be measured using commonly available wind speed meters and the blade speed is known from the rotation speed of the rotor and the radial distance from the point of interest on the blade to the centre of the hub 102.

Accordingly, the angle of attack can be determined from a single measured flap force F1 or from a combination of flap forces F1, F2, F3 and the determined magnitude of the resulting wind speed v_res. Advantageously, two or more flap forces may be combined, for example, as a linear combination, to obtain more reliable values of the angle of attack.

The determined angle of attack AoA can be used to adjust the angle of the trailing edge flaps 201 or other lift modifying means 201 by comparing the angle of attack with desired aerodynamic properties in a feedback control system configured for controlling, for example, the flap angle of trailing edge flaps.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A wind turbine blade sensor for sensing loads on a wind turbine blade, the sensor comprising,
    a trailing edge flap connectable with the blade,
    a restraining connection for connecting the trailing edge flap with the blade so as to enable linear or rotational movement of the flap relative the blade in response to a load acting on the flap,
    a motion sensor for sensing the linear or rotational movement of the trailing edge flap relative to the blade, and
    a control system operatively coupled to the motion sensor, the control system configured to determine a flap force acting on the trailing edge flap by sensing the linear or rotational movement of the trailing edge flap.

2. The blade sensor according to claim 1, where the restraining connection is configured to enable linear or rotational movement substantially in only one dimension.

3. The blade sensor according to claim 1, comprising first and second restraining connections, each being configured to enable movement of the trailing edge flap in first and second different dimensions, and comprising first and second displacement sensors for sensing the first and second movements.

4. The blade sensor according to claim 1, wherein the restraining connection comprises an elastic element for limiting a magnitude of the linear or rotational movement of the flap.

5. The blade sensor according to claim 1, where the restraining connection is a self-restoring connection having a neutral position corresponding to a neutral position of the flap.

6. The blade sensor according to claim 5, where the self-restoring connection comprises first and second elastic components arranged to affect the restraining connection with equal both but opposite non-zero spring forces.

7. The blade sensor according to claim 1, wherein the restraining connection comprises a guide for constraining the direction of the movement of the flap.

8. The blade sensor according to claim 1, where the restraining connection enables linear or rotational movement in two opposite directions of the flap.

9. The blade sensor according to claim 1, comprising a first part fixed to the blade and a second part fixed to the trailing flap, where the first part is moveable relative to the second part via a linear or rotational guide having a single motional degree of freedom and where motion between the first and second parts is restrained by the restraining connection.

10. The blade sensor according to claim 9, where the motion sensor is fixed to the first part or the second part and is configured to sense a distance to the opposite respective second or first part via contact or non-contact sensing.

11. A wind turbine blade comprising,
    an elongated structural body having an airfoil-shaped profile, a leading edge and a trailing edge,
    one or more controllable trailing edge flaps for changing aerodynamic properties of the blade, and
    one or more blade sensors positioned adjacent but separate from a controllable trailing edge flap and configured to have an insignificant effect on the aerodynamic properties of the blade, the one or more blade sensors comprising,
    a trailing edge flap connectable with the blade,
    a restraining connection for connecting the trailing edge flap with the blade so as to enable linear or rotational movement of the flap relative the blade in response to a load acting on the flap, a motion sensor for sensing the linear or rotational movement of the trailing edge flap relative to the blade, and a control system operatively coupled to the motion sensor, the control system configured to determine a flap force acting on the trailing edge flap by sensing the linear or rotational movement of the trailing edge flap.

12. A wind turbine comprising, a tower, a nacelle coupled to the tower, a blade coupled to the nacelle, wherein the blade comprises:

an elongated structural body having an airfoil-shaped profile, a leading edge and a trailing edge, one or more controllable trailing edge flaps for changing aerodynamic properties of the blade, and one or more blade sensors positioned adjacent but separate from a controllable trailing edge flap and configured to have an insignificant effect on the aerodynamic properties of the blade, the one or more blade sensors comprising, a trailing edge flap connectable with the blade, a restraining connection for connecting the trailing edge flap with the blade so as to enable linear or rotational movement of the flap relative the blade in response to a load acting on the flap, a motion sensor for sensing the linear or rotational movement of the trailing edge flap relative to the blade, and a control system operatively coupled to the motion sensor, the control system configured to determine a flap force acting on the trailing edge flap by sensing the linear or rotational movement of the trailing edge flap.

13. A method for sensing loads on a wind turbine blade, the method comprising, providing a trailing edge flap connected to the blade, providing a restraining connection connecting the trailing edge flap with the blade so as to enable linear or rotational movement of the flap relative the blade in response to a load acting on the flap, and determining a flap force acting on the flap by sensing the linear or rotational movement of the flap using a motion sensor.

14. The method for sensing loads according to claim 13, further comprising determining an angle of attack of a resulting wind acting on the blade using the flap force and a magnitude of the resulting wind.

\* \* \* \* \*